US006842988B2

(12) United States Patent
Johansson

(10) Patent No.: US 6,842,988 B2
(45) Date of Patent: Jan. 18, 2005

(54) DEVICE IN A PORTABLE POWER TOOL

(75) Inventor: Jörgen Johansson, Jönköping (SE)

(73) Assignee: Aktiebolaget Electrolux, Stockholm (SE)

( * ) Notice: Subject to any disclaimer, the term of this patent is extended or adjusted under 35 U.S.C. 154(b) by 166 days.

(21) Appl. No.: 09/801,250

(22) Filed: Mar. 7, 2001

(65) Prior Publication Data

US 2001/0020333 A1 Sep. 13, 2001

(30) Foreign Application Priority Data

Mar. 10, 2000 (SE) ............................................. 0000791

(51) Int. Cl.[7] ............................ B23D 45/16; B27B 5/32

(52) U.S. Cl. .......................... 30/388; 30/166.3; 83/481; 83/666

(58) Field of Search ................................ 30/388, 166.3; 83/481, 665, 666, 698.41, 469

(56) References Cited

U.S. PATENT DOCUMENTS 146,648 A * 1/1874 Bugbee .................... 83/666 X
742,000 A * 10/1903 Brooks ..................... 83/666 X
2,945,519 A * 7/1960 Edgemond, Jr. et al. ...... 83/666
3,443,827 A * 5/1969 Acker et al. .................. 285/39
4,463,788 A * 8/1984 Corona et al. ............. 81/177.4
4,909,113 A * 3/1990 Ischenko et al. .......... 83/666 X
5,271,253 A * 12/1993 Cassada et al. .......... 292/251.5
5,447,086 A * 9/1995 Wittmaier et al. ............ 83/666
5,449,103 A * 9/1995 Tilley ......................... 224/244
6,244,149 B1 * 6/2001 Ceroll et al. ............... 83/477.2

* cited by examiner

*Primary Examiner*—Clark F. Dexter
(74) *Attorney, Agent, or Firm*—Pearne & Gordon LLP

(57) ABSTRACT

A locking assembly for a portable, engine-powered, hand tool, such as a clearing saw. To facilitate removal and installation of a rotatable cutting tool (13), a rotatable shaft (11) driving the cutting tool is locked against rotation by a movable locking pin (17) of magnetic material that is secured in a locking position by a magnet (19) carried by a housing of the tool supporting the rotatable shaft.

7 Claims, 1 Drawing Sheet

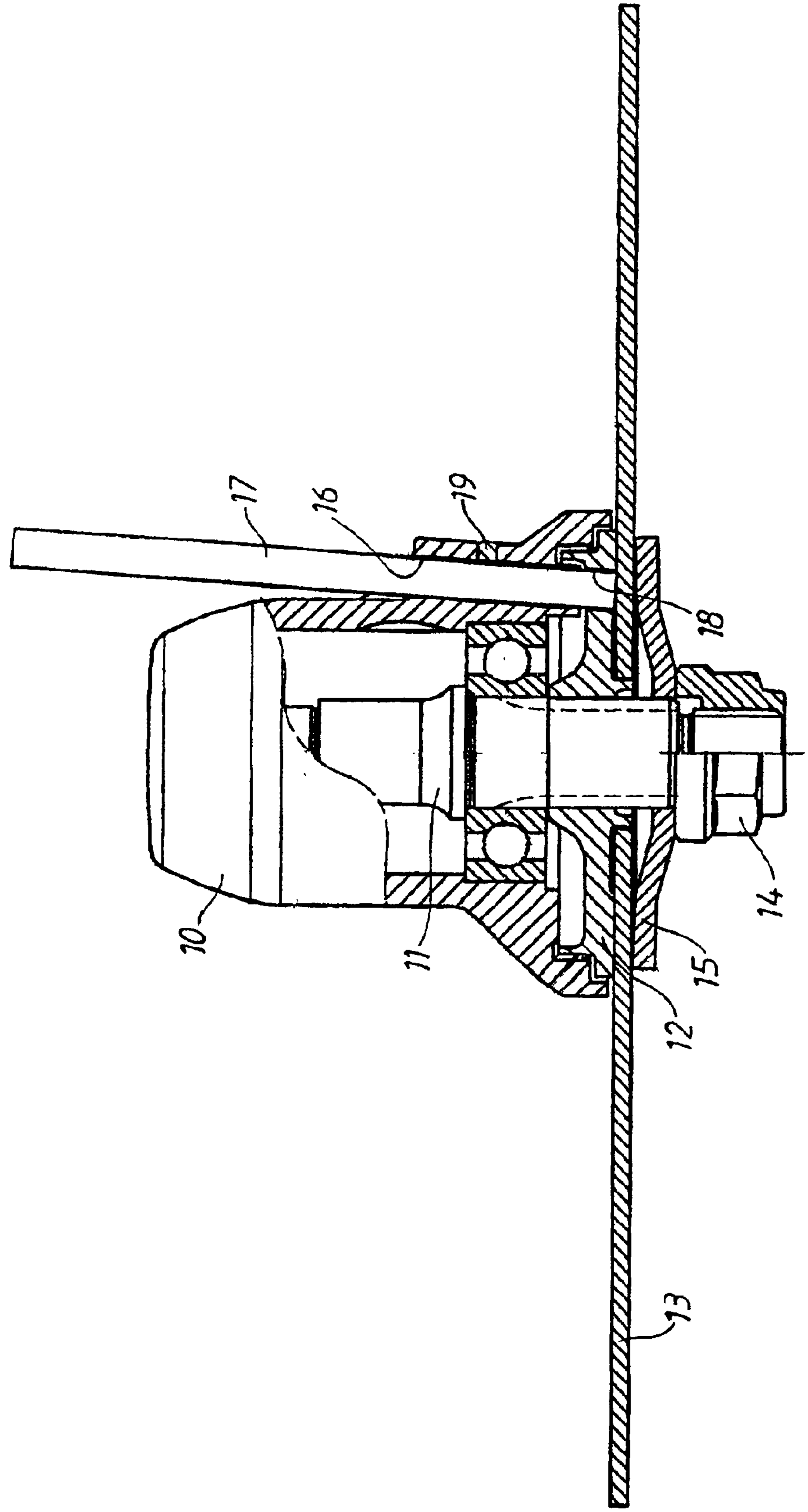
17
16
19
18
10
11
12
15
14
13

DEVICE IN A PORTABLE POWER TOOL

BACKGROUND OF THE INVENTION

The present invention relates in general to portable, engine-powered, hand tools, and more specifically, to a clearing saw with a changeable circular saw blade. Such tools include an engine, a housing and a rotatable drive shaft connected to a rotating cutting tool, such as a circular saw blade, that is releasably fastened to the end of the shaft. A locking pin is movable in an axial direction into a hole in the shaft, or a part attached to the shaft, to fix the shaft in a non-rotating mode in relation to the housing to facilitate installation and removal of the cutting tool. In portable, engine-powered, hand tools like clearing saws, the cutting tool is fastened to the shaft, extending from a gear box, for example, bu a nut screwed on to a threaded end of the shaft. In order to facilitate the changing of the cutting tool, the shaft must be stopped from rotating relative to the housing to make it possible to rotatably release or fasten the nut. The shaft is stopped from rotation by the locking pin that is moved into a position to interfere with shaft rotation wherein the shaft is blocked from rotating in relation to the gearbox. It is desirable to keep the locking pin in this locking position even if the machine is turned up side down or otherwise moved around so as to make it easier to change the cutting tool by unscrewing the nut.

There are different known methods to keep the locking pin in a locking position wherein the shaft is not able to rotate. These prior art methods utilize mechanical latching solutions including multiple parts. Since clearing saws work in very rough conditions, the mechanical latching solutions do not always work properly because of the dirt, dust wood particles, and other debris that can interfere with the mechanical latches during use. Another well known solution is to use a locking pin mounted in a hole in the housing and being under influence of a biasing spring that acts in an axial direction on the locking pin to hold it or bias it in an unlocking position. The locking pin is movable in an axial direction to a locking position and is mounted on the housing in such a manner that it will not fall out of the hole. The locking pin can be pushed into a locking position by the user by pressing a finger against the pin with a force stronger than the biasing spring. The user must keep his finger on the pin to keep the shaft locked, otherwise the pin will return to its normal, spring-biased, non-locking position. This solution might include a releasable stop device that keeps the pin in the locking position, however, such a mechanism would make the tool heavier and more complex.

The purpose of the present invention is to make a locking assembly of the aforementioned type that eliminates the above-described prior art problems. A tool according to the subject invention would also be easier to handle, would work better in hostile environments, and would produce a tool at lower cost than the prior art solutions described.

BRIEF SUMMARY OF THE INVENTION

In accordance with the invention, a portable, engine-powered hand tool, such as a clearing saw with a rotatable blade mounted to an end of a rotatable drive shaft, includes a locking assembly for holding the rotatable shaft in a fixed position during installation and removal of the blade. The assembly included a locking pin movable along its axis between unlocking and locking positions. At its locking position, the pin interferes with rotation of a shaft to which the blade is mounted, to thereby facilitate installation and removal of the blade. The locking pin can then be moved to an unlocking position to permit normal use of the tool. In accordance with the invention, the locking pin is made of magnetic material. A magnet fixed to the housing magnetically engages the pin to hold it at a locking or unlocking position as determined by the user.

BRIEF DESCRIPTION OF THE DRAWING

A fuller understanding of the invention may be had by referring to the following description and claims taken in conjunction with the accompanying drawing.

DETAILED DESCRIPTION OF THE INVENTION

A housing 10, including an engine powered gearbox, is connected to a user-held guide bar, not shown in the drawing, of a clearing saw. The gearbox includes a toothed transmission gear, not shown in the drawing, with a rotatably driven shaft 11. A fastening device 12 for holding in place a cutting tool 13 is attached to the low end of the shaft 11 as shown. The cutting tool 13, for example a circular saw blade, is attached to the fastening device by a nut 14 screwed on to the threaded end of shaft 11, and an elastic washer 15. The nut 14 can be unscrewed from the threaded end of the shaft 11 and released to make it possible to replace the cutting tool 13.

The gearbox housing 10 has on one of its sides an almost vertical hole 16. Inside the hole 16, a locking pin 17 is inserted, the pin 17 being made of a magnetic material, for example iron. The lower end of the locking pin 17 can be located or inserted in a matching opening or hole 18 in the fastening device 12. The surrounding housing wall defining the hole 16 includes a magnet 19 located at the inner surface of the hole 16 to magnetically engage and be in contact with the locking pin 17 when the locking pin 17 is inserted into the hole 16. The magnet 19 is preferably a neodymium magnet to increase the magnetic force between the magnet 19 and the locking pin 17 compared to an ordinary ferrite magnet.

In the drawing, the locking pin 17 is inserted into the aligned matching hole 18 in the fastening device 12, wherein the saw blade 13 and the shaft 11 are all locked and thereby not able to rotate. This makes it possible to unscrew the nut 14 from the threaded lower end of shaft 11 with an appropriate tool. To make it possible to insert the locking pin 17 into the hole 18, the saw blade 13 or, if no saw blade is attached, the fastening device 12, is rotated by hand until the centerline of hole 18 coincides with the centerline of the hole 16. After that, the locking pin is pushed into its locking position. The locking pin 17 will be kept in this position by the magnet 19, even though the gearbox is turned up side down to make it easy to screw or unscrew the nut to mount or unmount the saw blade. The cutting tool is therefore changed easily and without the risk that the locking pin 17 will fall out of its locking position. After the change of cutting tool, the locking pin 17 is removed from the vertical hole 16 or at least raised to an unlocking position, and the machine is ready to be used again. Since the described assembly to locate the pin 17 in its locking position does not include any moving parts (other than the pin 17) there is only a minimum risk for locking assembly failure due to dirt, dust or other debris.

It should be evident that this disclosure is by way of example and the various changes may be made by adding, modifying or eliminating details without departing from the fair scope of the teaching continued in this disclosure. The invention is therefore not limited to particular details of this disclosure except to the extent that the following claims are necessarily so limited.

What is claimed is:

1. A portable, engine-powered hand tool comprising:

a housing (10) with a rotatable shaft (11) releasably connected to a rotatable cutting tool (13);

a locking pin (17) that is movable along it axis inside a hole (16) in the housing (10) to a locking position, wherein the locking pin interferes with the rotation of the shaft (11) to lock the shaft (11) in a non-rotating position when the locking pin is in the locking position; and a magnet (19) carried by the housing at a distance from the rotatable cutting tool that permits magnetic communication between the magnet and the locking pin when the locking pin is in the locking position, wherein the magnetic communication between the magnet and the locking pin retains the locking pin (17) in its locking position to facilitate removal and installation of the cutting tool on the shaft.

2. A tool according to claim 1, wherein the locking pin (17) is made of a magnetic material and the magnet (19) is fastened to the housing (10).

3. A tool according to claim 1, wherein the magnet (19) is a neodymium magnet.

4. A tool according to claim 1, wherein a fastening device (12) for the cutting tool is attached to the shaft (11) and is provided with an opening (18) with an axial centerline that is alignable with an axial centerline of the hole (16) in the housing, wherein the locking pin (17) can be inserted into the opening (18).

5. A tool according to claim 1, wherein the housing (10) is a gear box housing for a clearing saw and the cutting tool (13) is a circular saw blade.

6. A tool according to claim 1 wherein the magnet is positioned adjacent to and in communication with the hole.

7. In a portable, engine-powered, hand tool having a circular saw blade releasably fixed to an end of a rotatable shaft, the improvement comprising:

a locking pin of magnetic material movable along its axis inside a hole (16) in the housing (10) from a non-locking position to a locking position that locks the rotatable shaft in a fixed position to facilitate installation and removal of the saw blade, the tool including a magnet carried by the housing at a distance from the rotatable cutting tool that permits magnetic communication between the magnet and the locking pin for holding the locking pin in its non-locking end locking positions.

* * * * *